United States Patent
Brill et al.

(10) Patent No.: US 8,727,624 B2
(45) Date of Patent: May 20, 2014

(54) STEPPED BEARING

(75) Inventors: Jeffrey Carl Brill, Poway, CA (US); Gary Paul Vavrek, San Diego, CA (US); Qingxuan Michael Zhang, San Diego, CA (US); Paul Edward Pickett, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 81 days.

(21) Appl. No.: 13/361,403

(22) Filed: Jan. 30, 2012

(65) Prior Publication Data

US 2013/0195387 A1    Aug. 1, 2013

(51) Int. Cl.
*F16C 17/06* (2006.01)
*F16C 25/02* (2006.01)

(52) U.S. Cl.
USPC .................. 384/129; 384/261; 384/309

(58) Field of Classification Search
USPC ......... 384/129, 261, 276, 316, 474, 569, 584, 384/587, 309; 29/898.02
See application file for complete search history.

(56) References Cited

U.S. PATENT DOCUMENTS

| | | | | |
|---|---|---|---|---|
| 2,977,163 A * | 3/1961 | Gales | ............. | 384/584 |
| 3,258,301 A * | 6/1966 | Porvatov | ........ | 384/454 |
| 3,692,372 A | 9/1972 | Pineo | | |
| 3,804,478 A * | 4/1974 | Andree | ......... | 384/615 |
| 4,512,673 A | 4/1985 | Condon, Jr. et al. | | |
| 5,102,241 A * | 4/1992 | Pflungner | ....... | 384/499 |
| 5,320,433 A * | 6/1994 | Kimata et al. | ..... | 384/473 |
| 5,529,011 A * | 6/1996 | Williams, Jr. | ..... | 114/245 |
| 6,511,228 B2 * | 1/2003 | Dusza | ............ | 384/475 |
| 7,044,643 B2 * | 5/2006 | Greubel | ......... | 384/462 |
| 2003/0108261 A1 * | 6/2003 | Yokota et al. | ...... | 384/474 |

FOREIGN PATENT DOCUMENTS

GB    1 467 092    3/1977

* cited by examiner

*Primary Examiner* — Marcus Charles
(74) *Attorney, Agent, or Firm* — Finnegan, Henderson, Farabow, Garrett & Dunner LLP

(57) ABSTRACT

A bearing assembly having a cylindrical outer bearing shell. The outer bearing shell including a first annular outer land, a second annular outer land, and a recess therebetween. The outer bearing shell further including a first positioning bore having a first bore diameter and a second positioning bore having a second bore diameter. The second bore diameter may be smaller than the first bore diameter. A diameter of the first annular outer land may be larger than a diameter of the second annular outer land.

20 Claims, 4 Drawing Sheets

STEPPED BEARING

TECHNICAL FIELD

The present disclosure relates generally to a bearing design, and more particularly, to methods and apparatuses for maintaining contact pressure of a bearing within a bearing housing.

BACKGROUND

Gas turbine engines (GTEs) produce power by extracting energy from a flow of hot gas produced by combustion of fuel in a stream of compressed air. In general, GTEs have an upstream air compressor coupled to a downstream turbine with a combustion chamber (combustor) in between. Energy is produced when a mixture of compressed air and fuel is burned in the combustor, and the resulting hot gases are used to spin blades of a turbine. In typical GTEs, a main rotary shaft extends along an engine axis and couples rotational movement of various components of the GTE about the engine axis.

In order to assist the rotary shaft to spin, a GTE may include a plurality bearings aligned along the shaft. The plurality of bearings may allow relative motion between two or more parts. For example, each of the bearings may aid in rotational movement between the shaft and one or more components of the GTE, such as a compressor rotor and a turbine rotor, and stationary components of the GTE.

Bearings located within GTEs often undergo extreme temperature gradients which may cause thermal expansion of at least a portion of the bearing itself, the component within the GTE adjacent to the bearing, or both. U.S. Pat. No. 4,512,673 to Condon, Jr. et al. (the '673 patent) discloses a bearing cup for placement within a wall of a housing. According to the '673 patent, the bearing cup includes an outer restricting flange for preventing the bearing from moving into the housing as a result of axial forces acting on the bearing cup.

SUMMARY

Embodiments of the present disclosure may be directed to a bearing assembly. The bearing assembly may have a cylindrical outer bearing shell. The outer bearing shell may include a first annular outer land, a second annular outer land, and a recess therebetween. The outer bearing shell may further include a first positioning bore having a first bore diameter and a second positioning bore having a second bore diameter. The second bore diameter may be smaller than the first bore diameter. A diameter of the first annular outer land may be larger than a diameter of the second annular outer land.

In further embodiments, the present disclosure may include a bearing assembly for use between a compressor system and a combustor system of a gas turbine engine. The bearing assembly may include a cylindrical outer bearing shell. The outer bearing shell may include a first annular outer land having a first outer land diameter configured to be positioned proximate the compressor system, and a second annular outer land having a second outer land diameter configured to be positioned proximate the combustor system. The bearing assembly may further include a cylindrical bearing housing. The cylindrical bearing housing may be configured to receive the outer bearing shell therein. The first outer land diameter may be greater than the second outer land diameter and a different degree of an interference fit exists between the first outer surface and the housing, and the second outer surface and the housing to accommodate a thermal gradient across the outer bearing shell.

In further embodiments, the present disclosure may be directed to a bearing assembly for use in a gas turbine engine having an upstream compressor system and a downstream combustor system. The bearing assembly may include a cylindrical outer bearing shell. The outer bearing shell may include a first annular outer land positioned proximate the compressor system, a second annular outer land positioned proximate the combustor system, and a recess between the first annular outer land and the second annular outer land. A first positioning bore may have a first bore diameter and a second positioning bore may have a second bore diameter. The second bore diameter may be smaller than the first bore diameter. The bearing assembly may further include a cylindrical bearing housing. The cylindrical bearing housing may be configured to receive the outer bearing shell therein. Each of the first annular outer land and the second annular outer land are maintained within the bearing housing via an interference fit providing interference fit of at least 2,000 pounds of pressure during operation of the gas turbine engine.

Further embodiments of the present disclosure may include a method of installing a bearing assembly. The bearing assembly may include a cylindrical outer shell having a first annular outer land with a first outer land diameter, a second annular outer land with a second outer land diameter, and a recess therebetween. The first outer land diameter may be different than the second outer land diameter. The method may include providing the bearing assembly, and positioning the bearing assembly within a bearing housing. Additionally, the method may include securing a first connection member having a first connection member diameter to the bearing assembly adjacent the first annular outer land and securing a second connection member having a second connection member diameter to the bearing assembly adjacent the second annular outer land.

DETAILED DESCRIPTION

Figure 1:
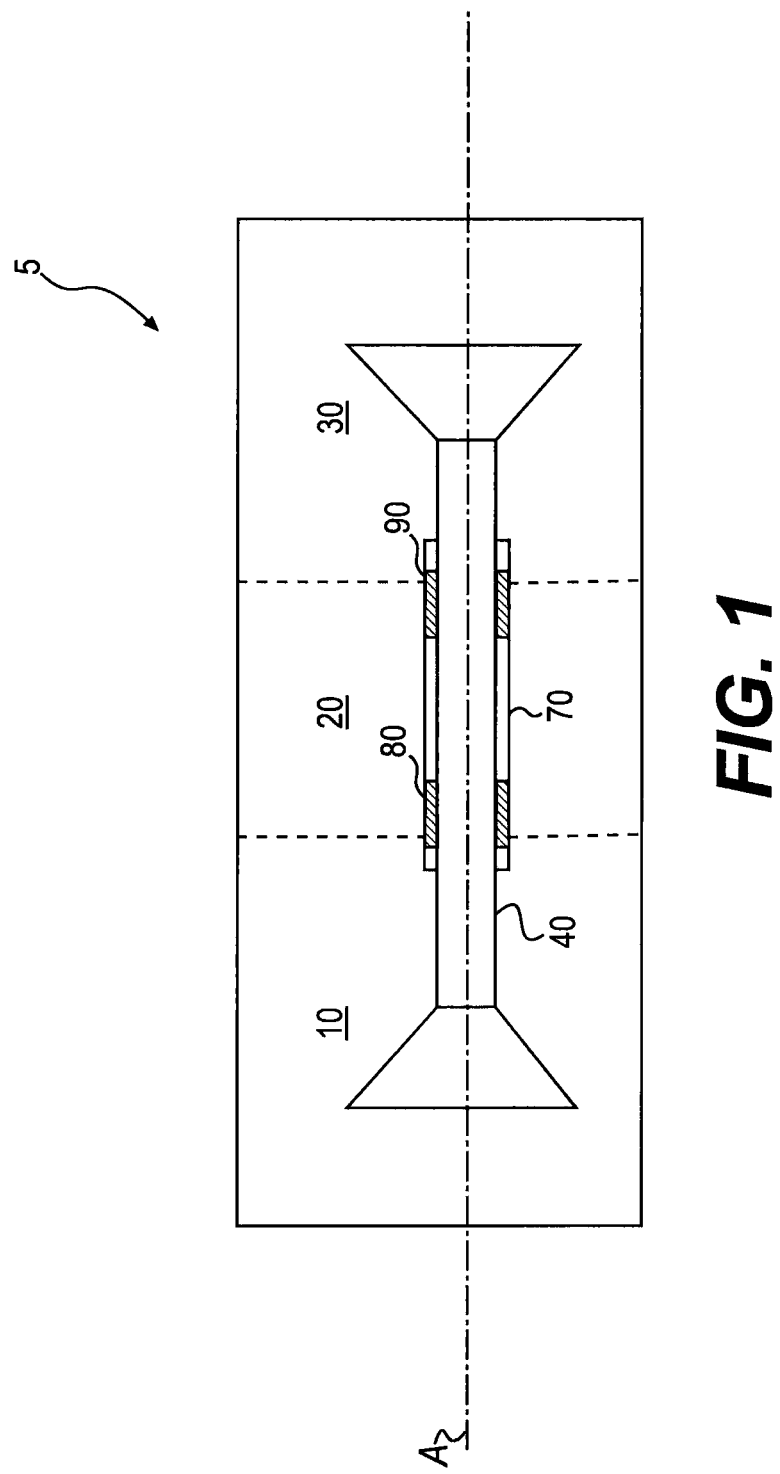
FIG. 1 is a schematic illustration of a GTE.

FIG. 1 illustrates an exemplary schematic gas turbine engine (GTE) 5 having a compressor system 10, a combustor system 20, and a turbine system 30 arranged lengthwise along an engine axis A on a rotary shaft 40. The compressor system 10 is configured to compress air and deliver the compressed air to the combustor system 20. The compressor system 10 may include a plurality of stationary blades or nozzles (not shown) and a plurality of rotary blades (not shown) configured to cooperate with one another to compress air. Additionally, the turbine system 30 may include a plurality of turbine blades and/or nozzles (not shown). Hot gases emitted from the combustor system 20 may be directed to the turbine blades so as to impart rotational movement to the turbine blades. The thus imparted rotational movement may be utilized to drive one or more machines and or components (not shown) intended to be driven by the GTE 5.

In order to support the rotational movement of one or more rotary components within the GTE 5, a bearing housing 70 may be provided in which one or more bearing assemblies 80, 90 may be disposed. For example, bearing assembly 80 may be positioned about shaft 40 in between the compressor system 10 and the combustor system 20. Likewise, bearing assembly 90 may be positioned about shaft 40 in between the combustor system 20 and the turbine system 30. Bearing assemblies 80, 90 may be of any appropriate type, such as, for example, a hydrodynamic tilt pad bearing assembly. As will be described in further detail below, such bearing assemblies may be in communication with a source of pressurized fluid such as oil or lubricant to facilitate rotary movement of the shaft 40 within bearing assemblies 80, 90. It is to be noted that additional bearing assemblies may be provided along the shaft 40. That is, GTE 5 may include any appropriate number of bearing assemblies along shaft 40 so as to allow for proper support an rotary movement of various components of the GTE 5. Additionally, not all bearing assemblies along the shaft 40 are required to be of the same type. That is, depending on the position of the bearing assembly within GTE 5, different types of bearing assemblies may be utilized.

Figure 2:
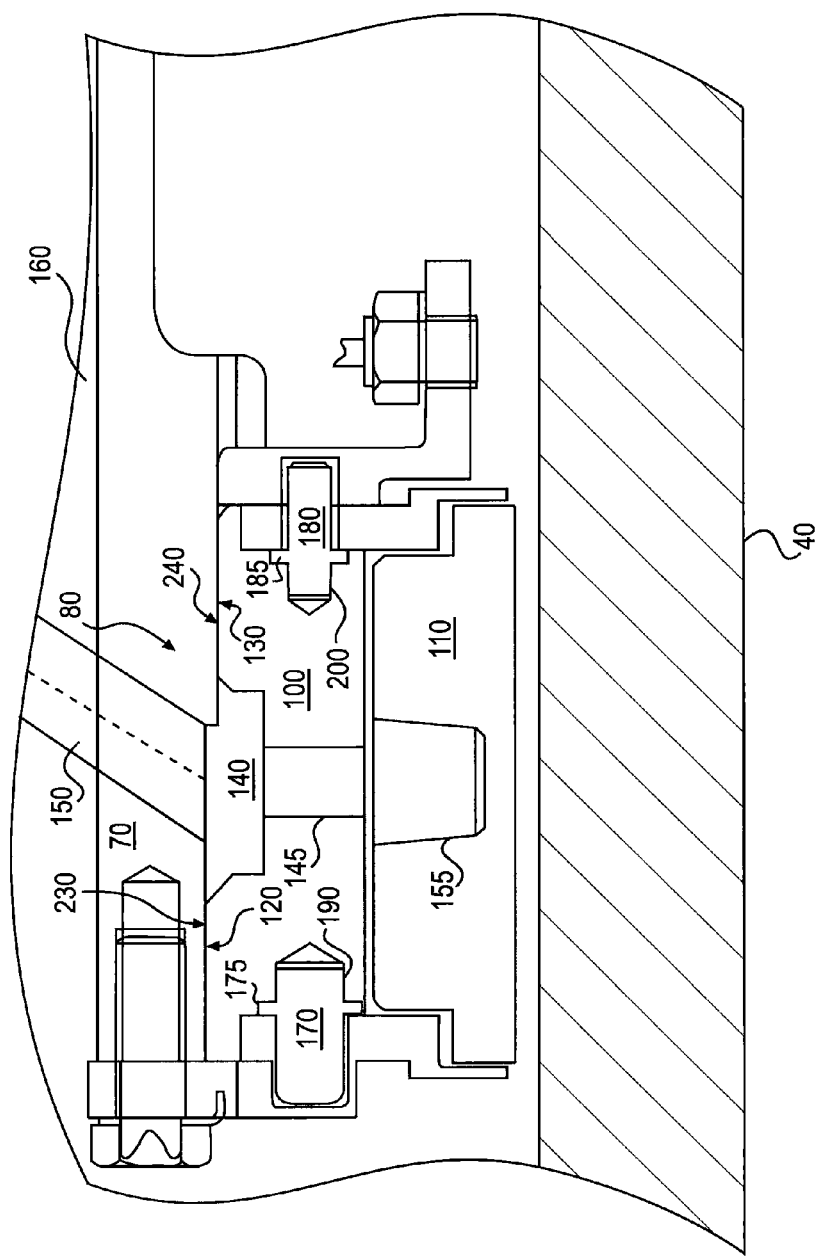
FIG. 2 is a cross-sectional illustration of the GTE of FIG. 1 having an exemplary bearing assembly.

FIG. 2 illustrates the GTE 5 having an exemplary bearing assembly 80 located about shaft 40 in between the compressor system 10 and the combustor system 20. Bearing assembly 80 may include an outer ring or shell 100 configured to cooperate with an inner surface of bearing housing 70. Outer shell 100 may include any suitable material, such as, for example, steel alloy 4340. Additionally, bearing housing 70 may be comprised of any suitable material, such as, for example, ductile iron. Bearing assembly 80 may further include an inner ring or shell 110 arranged concentrically within outer shell 100. Inner shell 110 may include a series of tilting pads on an inner surface thereof (not shown), as is known in the art, configured to cooperate with the shaft 40 and support rotary movement of the shaft 40.

As shown in FIG. 2, outer shell 100 may include a first annular land or surface 120, a second annular land or surface 130, and a recess 140 therebetween. The first annular surface 120 may be proximate the compressor system 10 whereas the second annular surface 120 may be proximate the combustor system 20. Each of first surface 120 and second surface 130 may be configured to contact the inner surface of bearing housing 70 and maintain an interference fit therewith. That is, first surface 120 and second surface 130 are configured to maintain sufficient contact pressure between the bearing assembly 80 and the bearing housing 70 so as to maintain the bearing assembly 80 in place and avoid unwanted vibrations.

Recess 140 may be in communication with a source of pressurized fluid such as oil or lubricant to facilitate rotary movement of the shaft 40. By way of non-limiting explanation, pressurized oil will be referred to hereafter. It is to be noted, however, that any sufficiently lubricious material may be selected if desired. Recess 140 may be aligned with a channel 150 extending through a housing 160 of the GTE 5 and bearing housing 70 and may be in fluid communication with one or more sources (not shown) of pressurized oil. As shown, the recess 140 may include a tapered open end to facilitate transfer of the pressurized oil into the recess 140. The source of pressurized oil may be configured to deliver oil pressurized to about 35 psi. The source may be configured to deliver appropriate amounts of oil to one or more bearing assemblies with the GTE 5. That is, the source may be configured to deliver approximately 35 gallons of oil per minute to the one or more bearing assemblies supplied by the source. GTE 5 may include any number of channels 150 such that sufficient lubrication may be supplied to bearing assembly 80.

Recess 140 may further be in communication with a passage 145. Passage 145 may extend perpendicularly to the engine axis and be configured to communicate pressurized oil from the recess 140 therethrough. As shown in FIG. 2, passage 145 may extend from a bottom, i.e., deepest portion of recesses 140 through a thickness of the outer shell 100 to the inner shell 110. Inner shell 110 may further include a trough 155 configured to received the pressurized oil delivered through the passage 145 from the recesses 140. Trough 155 may then deliver collected pressurized oil received therein to an inner surface of the inner shell 110 such that a fluid layer may be formed between the inner shell 110 and the shaft 40, thereby creating a fluid bearing on the shaft 40, as is known in the art. Such a fluid layer may assist in rotation of the shaft 40 and increase the useable life of bearing assembly 80 and/or inner shell 110.

Bearing assembly 80 may further include a first connection member 170 and a second connection member 180. Connection members 170 and 180 may be configured to maintain bearing assembly 80 in proper placement within the stationary bearing housing 70 of the GTE 5. Each of connection members 170 and 180 may be threaded, or otherwise configured for retention within outer shell 100. Further, each may include a tapered end (FIG. 2) configured to assist in insertion of the first connection member 170 and the second connection member 180 into outer shell 100.

As shown in FIG. 2, connection members 170 and 180 may be sized or shaped differently than one another. That is, as will be explained in more detail below, connection member 170 may have a dimension or shape that is different than a dimension or shape of connection member 180. Moreover, bearing assembly 80 may include a first receiving portion 190 and a second receiving portion 200 sized and/or shaped to cooperate with the first connection member 170 and the second connection member 180, respectively. First and second receiving portions 190, 200 may be configured to receive the first and second connection members 170 and 180, respectively, so as to assist in retaining bearing assembly 80 in position within GTE 5.

As shown in FIG. 2, first connection member 170 may include a first limit portion 175. Likewise, second connection member 180 may include a second limit portion 185. For example, each limit portion 175, 185 may include an area of increased diameter about first connection member 170 and second connection member 180, respectively. That is, limit portions 175 and 185 may define radial lips surrounding, either continuously or along discrete portions, each of first connection member 170 and second connection member 180, respectively. As such, limit portion 175 may limit the axial depth of insertion of first connection member 170 into first receiving portion 190. Additionally, second limit portion 185 may limit the axial depth of insertion of second connection member 180 into second receiving portion 200.

Figure 3A:
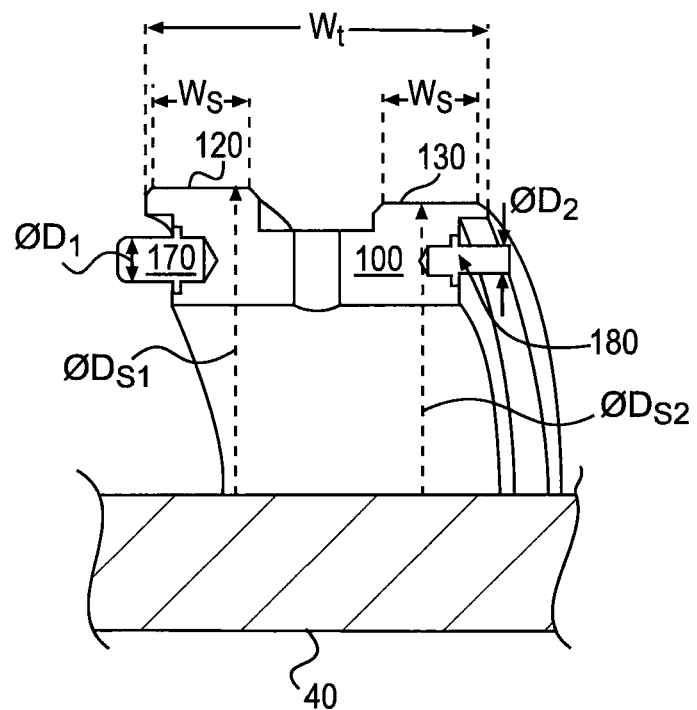
FIG. 3A is a cross-sectional illustration of an exemplary bearing of the bearing assembly of FIG. 2.

FIG. 3A illustrates a cross-sectional view of outer shell 100 of bearing assembly 80. As shown, each of first surface 120 and second surface 130 include an axial width Ws. Width Ws may be selected such that a sufficient portion of outer shell 100 may cooperate with bearing housing 70 so as to avoid unwanted vibration. As shown in FIG. 3A, first surface 120 of outer shell 100 may include a first surface diameter $D_{s1}$. Additionally, second surface 130 of outer shell 100 may include a second surface diameter $D_{s2}$. First surface diameter $D_{s1}$ and second surface diameter $D_{s2}$ are different from one another. That is, first surface diameter $D_{s1}$ is larger than the second surface diameter Ds2. The specific dimensions of the first surface diameter Ds1 and the second surface diameter Ds2 may be selected so as to maintain a minimum of 2,000 pounds of contact pressure between the first surface 120 and the bearing housing 70, and between the second surface 130 and the bearing housing 70 during operation of the GTE 5. Such pressure may prevent outer shell 100 from being dislodged, or loosened from bearing housing 70 during operation of GTE 5, as will be described in more detail below.

As noted above, a dimension and/or shape of first connection member 170 may be different than a corresponding dimension or shape of second connection member 180. As shown in FIG. 3A, for example, a diameter D1 of first connection member 170 may be different than a diameter D2 of second connection member 180. That is, at least one of diameters D1 and D2 may be larger than the other to ensure proper placement of bearing assembly 80 during assembly. Indeed, by sizing and/or shaping first connection member 170 and second connection member 180 differently, bearing assembly 80 may only be positioned within the bearing housing 70 in one position. As such, manufacturer personnel or maintenance personnel may be prevented from error in the assembly process.

As shown, the recess 140 may include a sufficient depth so as to receive the pressurized oil through one or more channels 150. The depth may be selected such that an ample supply of pressurized oil may be received within recess 140 and delivered via passageway 145 to inner shell 110. As noted above, recess 140 may also include a tapered open end to facilitate delivery of the pressurized oil therein.

Figure 3B:
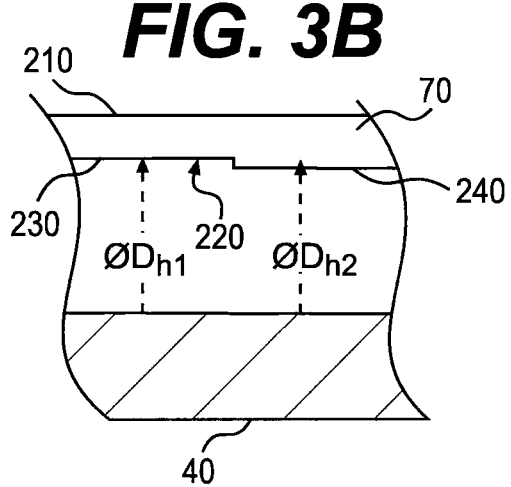
FIG. 3B is a cross-sectional illustration of an exemplary bearing housing of the bearing assembly of FIG. 2.

FIG. 3B illustrates a cross-sectional view of bearing housing 70. Bearing housing 70 may have an outer surface 210 configured for receipt within the housing 60 of the GTE 5. Bearing housing may further include an inner surface 220 having a variable diameter. As shown in FIG. 3B, variable diameter inner surface 220 may include a first annular housing land or surface 230 and a second annular housing land or surface 240. First housing surface 230 may be configured to cooperate with first surface 120 of outer shell 100. Similarly, second housing surface 240 may be configured to cooperate with second surface 130 of outer shell 100.

In order to maintain sufficient contact pressure between the outer shell 100 and the bearing housing 70, the diameters of first housing surface 230 and second housing surface 240 may be determined Indeed, the first housing surface 230 may have a first housing surface diameter Dh1 and the second housing surface 240 may have a second housing surface diameter Dh2. First housing surface diameter Dh1 may be different than second housing surface diameter Dh2. That is, first housing surface diameter Dh1 is larger than second housing surface diameter Dh2. The specific dimensions of the first housing diameter Dh1 and the second housing diameter Dh2 may be selected so as to maintain a minimum of 2,000 pounds of contact pressure between the first surface 120 and the first housing surface 230, and between the second surface 130 and the second housing surface during operation of the GTE 5. Such pressure may prevent outer shell 100 from being dislodged, or loosened from bearing housing 70 during operation of GTE 5, as will be described in more detail below.

In order to ensure proper installation of the bearing assembly 80 into the GTE 5, outer shell 100 and bearing housing 70 should be machined according to strict tolerances. That is, the first surface diameter Ds1, the second surface diameter Ds2, the first housing surface diameter Dh1, and the second housing surface diameter Dh2 may require machining within plus or minus 0.0005 inches (0.00127 cm). Such narrow tolerances help to ensure sufficient contact pressure between bearing housing 70 and outer shell 100 during operation of GTE 5.

As noted above, the values of first surface diameter Ds1 and first housing surface diameter Dh1 may be selected to maintain 2,000 pounds of contact pressure therebetween during operation of the GTE 5. As such, in an exemplary embodiment, a radial interference fit between outer shell 100 and bearing housing 70 adjacent first surface 120 is may be −0.0028 inches (−0.007112 cm). In such an exemplary configuration, the interference fit, i.e. the contact pressure between first surface 120 and first housing surface 230 is approximately 2,926 pounds during operation of the GTE 5. It is to be noted that this value of contact pressure has been determined during operation of the GTE 5, and may be increased or decreased according to a temperature gradient experienced across the bearing assembly 80 during operation. This pressure has been found to be sufficient to retain first surface 120 in place within first housing surface 230 such that subsynchronous vibrations may be avoided. Indeed, such a pressure may be adequate to avoid dislodging or loosening of first surface 120 within first housing surface 230 due to thermal gradients within the GTE 5, especially during startup.

Additionally, as noted above, the values of second surface diameter Ds2 and second housing surface diameter Dh2 may be selected to maintain 2,000 pounds of contact pressure therebetween during operation of the GTE 5. As such, in an exemplary embodiment, a radial interference fit between outer shell 100 and bearing housing 70 adjacent second surface 130 is −0.0024 inches (0.006096 cm). In such an exemplary configuration, the interference fit, i.e. the contact pressure between second surface 130 and second housing surface 240 is approximately 3,155 pounds. It is to be noted that this value of contact pressure has been determined during operation of the GTE 5, and may be increased or decreased according to a temperature gradient experienced across the bearing assembly 80 during operation. This pressure has been found to be sufficient to retain second surface 130 in place within second housing surface 240 such that subsynchronous vibrations may be avoided. Indeed, such a pressure may be adequate to avoid dislodging or loosening of second surface 130 within second housing surface 240 due to thermal gradients within the GTE 5, especially during startup.

As noted, the above dimensions are exemplary values. Additional values may be used so long as appropriate pressure is maintained between the first surface 120 and the first housing surface 230, as well as between the second surface 130 and the second housing surface 240. Such values may be achieved by varying the first surface diameter Ds1, second surface diameter Ds2, first housing surface diameter Dh1, and second housing surface diameter Dh2. Exemplary values may include those displayed in Table 1. As listed in Table 1, the center row depicts nominal interference fit values. From the nominal values, maximum and minimum interference fits, as defined by tolerances, have been evaluated to ensure that material design margins have not been exceeded.

TABLE 1

| Radial Interference Fit (inches) | | Contact Pressure (pounds) | |
| --- | --- | --- | --- |
| Between first surface and first housing surface | Between second surface and second housing surface | Between first surface and first housing surface | Between second surface and second housing surface |
| −0.0028 | −0.0025 | 2648 | 3351 |
| −0.0028 | −0.0024 | 2926 | 3156 |
| −0.0027 | −0.0023 | 2190 | 3048 |

TABLE 1-continued

| Radial Interference Fit (inches) | | Contact Pressure (pounds) | |
|---|---|---|---|
| Between first surface and first housing surface | Between second surface and second housing surface | Between first surface and first housing surface | Between second surface and second housing surface |

Industrial Applicability

The disclosed bearing assembly may be applicable to any GTE 5 where thermal gradients occur. Additionally, the disclosed bearing assembly may be applicable to any system where bearings are exposed to thermal gradients.

Figure 4:
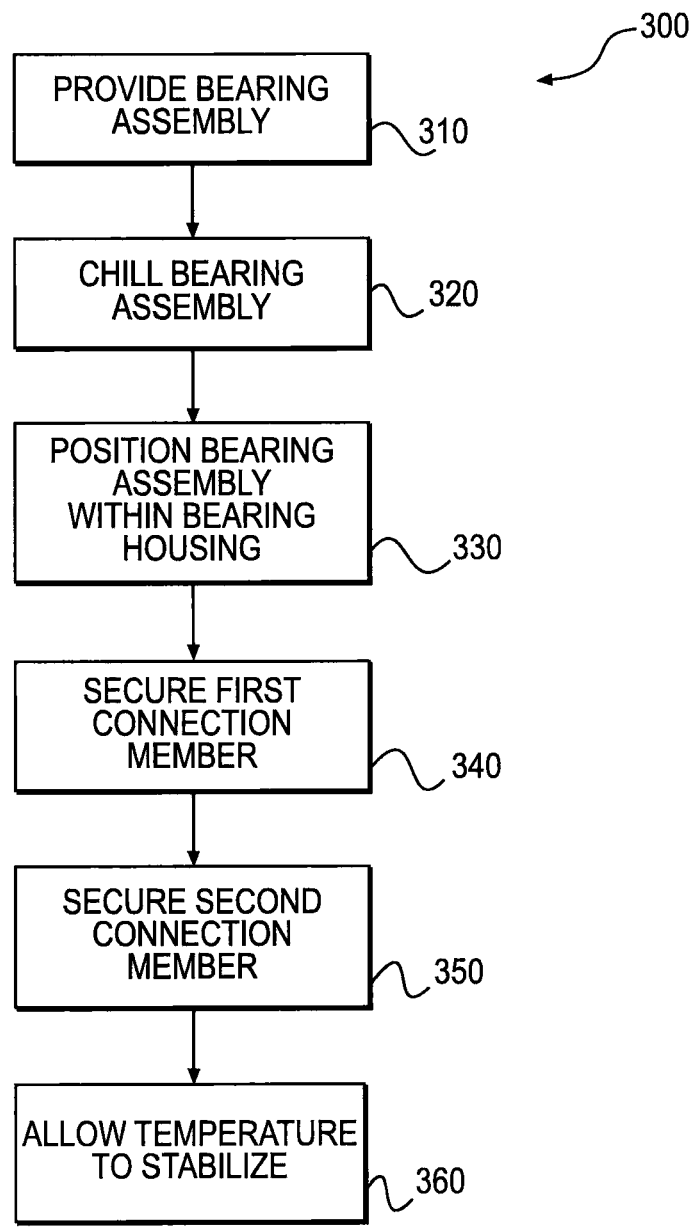
FIG. 4 is an exemplary method of inserting the exemplary bearing of FIGS. 2 and 3A into a GTE.

As shown in FIG. 4, a method 300 of installing bearing assembly 80 into GTE 5 is illustrated. The method 300 may include providing bearing assembly 80 at step 310. At step 320, at least a portion of bearing assembly 80 may optionally be chilled. As noted above, bearing assembly 80 includes metal components to be positioned tightly within a housing 160 of the GTE 5. Specifically, bearing housing 70 may be comprised of ductile iron, whereas outer shell may be comprised of stainless steel 4340. As known, metal materials contract when chilled. As such, chilling at least a portion of bearing assembly 80 may aid in inserting bearing assembly 80 into housing 160 of GTE 5. Bearing assembly 80 may be chilled using any appropriate methods such as, for example, a freezer (not shown) and/or placement of the bearing assembly in a bed of dry ice (not shown).

At step 330, bearing assembly 80, including outer shell 100, inner shell 110, and bearing housing 70, may be positioned within the housing 160 of GTE 5. As such, bearing assembly 80 may be positioned about shaft 40. As discussed above, outer shell 100 may include first and second receiving portions 190 and 200, respectively, having varying dimensions and/or shapes configured to cooperate with first and second connection members 170 and 180, respectively. As such, an installer can readily determine which arrangement bearing assembly 80 should be placed within the housing 160 by viewing the relative sizes of first and second receiving portions 190 and 200, respectively.

At step 340, first connection member 170 may be inserted into first receiving portion 190. Additionally, at step 350, second connection member 170 may be inserted into second receiving portion 200. Accordingly, bearing assembly 80 may be secured within housing 160 of GTE 5. Following installation, bearing assembly 80 may be permitted to return to a pre-chilled temperature at step 360. That is, if bearing assembly 80 was chilled at step 320, bearing assembly 80 may now be warmed or otherwise permitted to return to its pre-chilled temperature. As such, the metal components of bearing assembly may expand. Accordingly, an increased radial pressure fit will assist in maintaining bearing assembly 80 in position during operation of GTE 5.

The presently disclosed bearing assembly 80 and method for installing it into the GTE 5, have numerous features. As noted above, bearing assembly 80 may be exposed to a harsh environment within GTE 5, especially during start up and shut down of GTE 5. In particular, bearing assembly 80 may experience a thermal gradient of about 40° F. (4.5° C.) between the first surface 120 adjacent the compressor system 10 and the second surface 130 adjacent the combustor system 20. Indeed, the first surface 120 may be exposed to higher temperatures due to its position within GTE 5. For example, first surface 120 may be located proximate swirling hot gases and oil such that it is heated more rapidly than second surface 130, thus creating a thermal gradient across bearing assembly 80.

The thus created thermal gradient will cause expansion of outer shell 100 adjacent to the first surface 120 to occur at a different degree with respect to expansion of the outer shell 100 adjacent to the second surface 130. Bearing assembly 80, however, is configured to accommodate such varying expansion by way of the first and second surfaces 120 and 130 having different surface diameters Ds1, Ds2, and the first and second housing surfaces 230 and 240 having different housing surface diameters Dh1, Dh2. Accordingly, as noted above, at least a minimum of 2,000 pounds of contact pressure may be maintained between first surface 120 and first housing surface 230, and between second surface 130 and second housing surface 240.

Since bearing assembly 80 may maintain at least 2,000 pounds of contact pressure, vibration between outer shell 100 and bearing housing 70 may be avoided. As such, damaging subsynchronous vibrations may be avoided.

It will be apparent to those skilled in the art that various modifications and variations can be made to the disclosed bearing assembly and method of installing it within GTE 5. Other embodiments will be apparent to those skilled in the art from consideration of the specification and practice of the disclosed embodiments. For example, in an alternate exemplary embodiment, the orientation of the bearing assembly may be reversed to accommodate a varied temperature gradient. For example, if the bearing assembly experiences a higher temperature on a side of the bearing assembly proximate the combustor, the side of the bearing assembly adjacent the combustor system may have a higher interference fit than the side of the bearing assembly adjacent compressor system. It is intended that the specification and examples be considered as exemplary only, with a true scope being indicated by the following claims and their equivalents.

What is claimed is:

1. A bearing assembly, comprising:
 a cylindrical outer bearing shell, the outer bearing shell including:
 a first annular outer land;
 a second annular outer land;
 a recess between the first annular outer land and the second annular outer land;
 a first positioning bore having a first bore diameter; and
 a second positioning bore having a second bore diameter, said second bore diameter being smaller than said first bore diameter;
 wherein a diameter of the first annular outer land is larger than a diameter of the second annular outer land.

2. The bearing assembly of claim 1, wherein the outer bearing shell further includes a passage extending between the recess and an inner surface of the outer bearing shell.

3. The bearing assembly of claim 2, further comprising:
 a cylindrical bearing housing, the cylindrical bearing housing configured to receive the outer bearing shell therein.

4. The bearing assembly of claim 3, wherein the housing includes a first annular inner surface having a first inner surface diameter and a second annular inner surface having a second inner surface diameter, wherein the first inner surface diameter is greater than the second inner surface diameter.

5. The bearing assembly of claim 4, wherein the first annular inner surface is configured to mate with the first annular outer land.

6. The bearing assembly of claim 5, wherein the second annular inner surface is configured to mate with the second annular outer land.

7. The bearing assembly of claim 6, wherein the diameter of the first annular outer land, the first annular inner surface diameter, the diameter of the second annular outer land, and the second annular inner surface diameter are selected to provide different interference fits between the outer bearing shell and the cylindrical bearing housing.

8. The bearing assembly of claim 7, wherein an interference fit between the first annular outer land and the first inner surface is greater than an interference fit between the second annular outer land and the second inner surface.

9. The bearing assembly of claim 7, wherein the diameter of the first annular outer land, the first annular inner surface diameter, the diameter of the second annular outer land, and the second annular inner surface diameter are selected to provide varying contact pressure between the outer bearing shell and the cylindrical bearing housing.

10. The bearing assembly of claim 7, wherein the different degrees of interference fit are further selected to maintain at least 2,000 pounds of pressure.

11. A gas turbine engine including the bearing assembly of claim 1 between a compressor system and a combustor system of the gas turbine engine.

12. The bearing assembly of claim 1, wherein the first positioning bore extends in a direction perpendicular to the diameter of the first annular outer land and the second positioning bore extends in a direction perpendicular to the diameter of the second annular outer land.

13. A bearing assembly, comprising:
a cylindrical outer bearing shell, the outer bearing shell including:
a first annular outer land;
a second annular outer land;
a recess between the first annular outer land and the second annular outer land;
a first positioning bore having a first bore diameter; and
a second positioning bore having a second bore diameter, said second bore diameter being smaller than said first bore diameter;
wherein a diameter of the first annular outer land and a diameter of the second annular outer land are selected to provide different interference fits between the outer bearing shell and a cylindrical bearing housing configured to receive the outer bearing shell.

14. The bearing assembly of claim 13, wherein the outer bearing shell further includes a passage extending between the recess and an inner surface of the outer bearing shell.

15. The bearing assembly of claim 13, wherein the housing includes a first annular inner surface having a first inner surface diameter configured to mate with the first annular outer land, and a second annular inner surface having a second inner surface diameter configured to mate with the second annular outer land, wherein the first inner surface diameter is greater than the second inner surface diameter, and an interference fit between the first annular outer land and the first inner surface is greater than an interference fit between the second annular outer land and the second inner surface.

16. The bearing assembly of claim 15, wherein the diameter of the first annular outer land, the first annular inner surface diameter, the diameter of the second annular outer land, and the second annular inner surface diameter are selected to provide varying contact pressure between the outer bearing shell and the cylindrical bearing housing.

17. The bearing assembly of claim 15, wherein the different degrees of interference fit are further selected to maintain at least 2,000 pounds of pressure.

18. A bearing assembly, comprising:
a cylindrical outer bearing shell, the outer bearing shell including:
a first annular outer land;
a second annular outer land; and
a recess between the first annular outer land and the second annular outer land;
wherein a diameter of the first annular outer land and a diameter of the second annular outer land are selected to provide different interference fits between the outer bearing shell and a cylindrical bearing housing configured to receive the outer bearing shell.

19. The bearing assembly of claim 18, wherein the outer bearing shell further includes a passage extending between the recess and an inner surface of the outer bearing shell.

20. The bearing assembly of claim 18, wherein the housing includes a first annular inner surface having a first inner surface diameter configured to mate with the first annular outer land, and a second annular inner surface having a second inner surface diameter configured to mate with the second annular outer land, wherein the first inner surface diameter is greater than the second inner surface diameter and an interference fit between the first annular outer land and the first inner surface is greater than an interference fit between the second annular outer land and the second inner surface.

* * * * *